US012379871B2

(12) United States Patent
Shin et al.

(10) Patent No.: US 12,379,871 B2
(45) Date of Patent: Aug. 5, 2025

(54) SYSTEM AND STORAGE DEVICE FOR EXECUTING READ COMMAND USING READ RECOVERY LEVEL AND METHODS OF OPERATION

(71) Applicant: SK hynix Inc., Icheon-si (KR)

(72) Inventors: Young Kyun Shin, Icheon-si (KR); Jung Hyun Joh, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 30 days.

(21) Appl. No.: 18/058,751

(22) Filed: Nov. 24, 2022

(65) Prior Publication Data

US 2024/0094952 A1 Mar. 21, 2024

(30) Foreign Application Priority Data

Sep. 16, 2022 (KR) .......................... 10-2022-0116728

(51) Int. Cl.
*G06F 3/06* (2006.01)
(52) U.S. Cl.
CPC .......... *G06F 3/0659* (2013.01); *G06F 3/0604* (2013.01); *G06F 3/0679* (2013.01)
(58) Field of Classification Search
CPC ..... G06F 3/0659; G06F 3/0604; G06F 3/0679
See application file for complete search history.

(56) References Cited

U.S. PATENT DOCUMENTS

| 11,294,594 B2 | 4/2022 | Wells et al. |
| 2018/0089024 A1* | 3/2018 | Hahn ................... G06F 3/0679 |
| 2019/0042150 A1 | 2/2019 | Wells et al. |
| 2022/0197741 A1* | 6/2022 | Pitchumani ......... G06F 11/1048 |

FOREIGN PATENT DOCUMENTS

KR  10-2021-0014564 A  2/2021

OTHER PUBLICATIONS

Meririam Webster definition of the term "may" captured by archive.org Jan. 9, 2021 (Year: 2021).*
The NVM Express Base Specificaiton Revision 2.0a Jul. 23, 2021 (Year: 2021).*

* cited by examiner

*Primary Examiner* — Tim T Vo
*Assistant Examiner* — Janice M. Girouard

(57) ABSTRACT

A storage device may receive, from an external device, a target read recovery level indicating information on a read command execution completion time and an error recovery amount requested by the external device, may read, from a memory, data requested by a read command transmitted by the external device, and may transmit, to the external device, a response regarding a result of executing the read command transmitted by the external device within the read command execution completion time indicated by the target read recovery level.

15 Claims, 12 Drawing Sheets

RRL_CAND

| Level | O/M |
|---|---|
| 0 | O |
| 1 | O |
| 2 | O |
| 3 | O |
| 4 | M |
| 5 | O |
| 6 | O |
| 7 | O |
| 8 | O |
| 9 | O |
| 10 | O |
| 11 | O |
| 12 | O |
| 13 | O |
| 14 | O |
| 15 | M | maximum recovery minimum recovery

| Level | O/M |
|---|---|
| 0 | O |
| 1 | O |
| 2 | O |
| 3 | O |
| 4 | M |
| 5 | O |
| 6 | O |
| 7 | O |
| 8 | O |
| 9 | O |
| 10 | O |
| 11 | O |
| 12 | O |
| 13 | O |
| 14 | O |
| 15 | M |

RRL_CAND maximum recovery minimum recovery

| RRL_CAND | |
|---|---|
| Level | O/M |
| 0 | O |
| 1 | O |
| 2 | O |
| 3 | O |
| 4 | M |
| 5 | O |
| 6 | O |
| 7 | O |
| 8 | O |
| 9 | O |
| 10 | O |
| 11 | O |
| 12 | O |
| 13 | O |
| 14 | O |
| 15 | M | maximum recovery minimum recovery

| TGT_RRL_CAND | | |
|---|---|---|
| Level | | O/M |
| 0 | 1 | O |
| 2 | 3 | O |
| 4 | 5 | O |
| 6 | 7 | O |
| 8 | 9 | M |
| 10 | 11 | O |
| 12 | 13 | O |
| 14 | 15 | O |
| 16 | 17 | O |
| 18 | 19 | O |
| 20 | 21 | O |
| 22 | 23 | O |
| 24 | 25 | O |
| 26 | 27 | O |
| 28 | 29 | O |
| 30 | 31 | M |

SYSTEM AND STORAGE DEVICE FOR EXECUTING READ COMMAND USING READ RECOVERY LEVEL AND METHODS OF OPERATION

CROSS-REFERENCE TO RELATED APPLICATION

The present application claims priority under 35 U.S.C. § 119(a) to Korean Patent Application No. 10-2022-0116728 filed in the Korean Intellectual Property Office on Sep. 16, 2022, which is incorporated herein by reference in its entirety.

BACKGROUND

1. Technical Field

Various embodiments generally relate to a system and a storage device for executing a read command on the basis of a read recovery level, and methods for operating the system or storage device.

2. Related Art

A storage device is a device that stores data on the basis of a request of an external device such as a computer, a mobile terminal like a smartphone and a tablet, or various other electronic devices.

The storage device may include a controller for controlling a memory (e.g., a volatile memory or a nonvolatile memory). The controller may receive a command from the external device, and may execute or control an operation for reading, writing or erasing data with respect to the memory included in the storage device consistent with the received command.

The storage device may perform an operation of recovering an error in the data that occurs in the process of reading the data in response to a request from the external device.

SUMMARY

Various embodiments are directed to a storage device capable of reducing a time required to read data, a system that utilizes the storage device, and methods for operating the system.

Also, various embodiments are directed to a storage device capable of efficiently operating under an environment when an error occurs in the read data, and a system and method for operating the system.

In an embodiment, a storage device may include: i) a memory configured to store data; and ii) a controller configured to receive, from an external device, a target read recovery level indicating a read command execution completion time and an error recovery amount requested by the external device; configured to read, from the memory, data requested by a read command transmitted by the external device; and configured to transmit, to the external device, a response regarding a result of executing the read command within the read command execution completion time indicated by the target read recovery level.

In an embodiment, a system may include: i) a storage device configured to execute a read command; and ii) an external device configured to transmit, to the storage device, a target read recovery level indicating information on a read command execution completion time and an error recovery amount, and to transmit a read command to the storage device. The storage device may transmit, to the external device, a response regarding a result of executing the read command within the read command execution completion time of the target read recovery level.

In an embodiment, a method for operating a system may include: i) generating, by an external device, a target read recovery level indicating information on a read command execution completion time and an error recovery amount requested by the external device; ii) transmitting, by the external device, the target read recovery level to a storage device; iii) transmitting, by the external device, a read command to the storage device; and iv) transmitting, by the storage device, a response regarding a result of executing the read command to the external device, within the read command execution completion time indicated by the target read recovery level.

According to the embodiments of the disclosed technology, it is possible to reduce a time required to read data and efficiently operate under an environment in which there is no problem even when an error occurs in read data.

DETAILED DESCRIPTION

Figure 1:
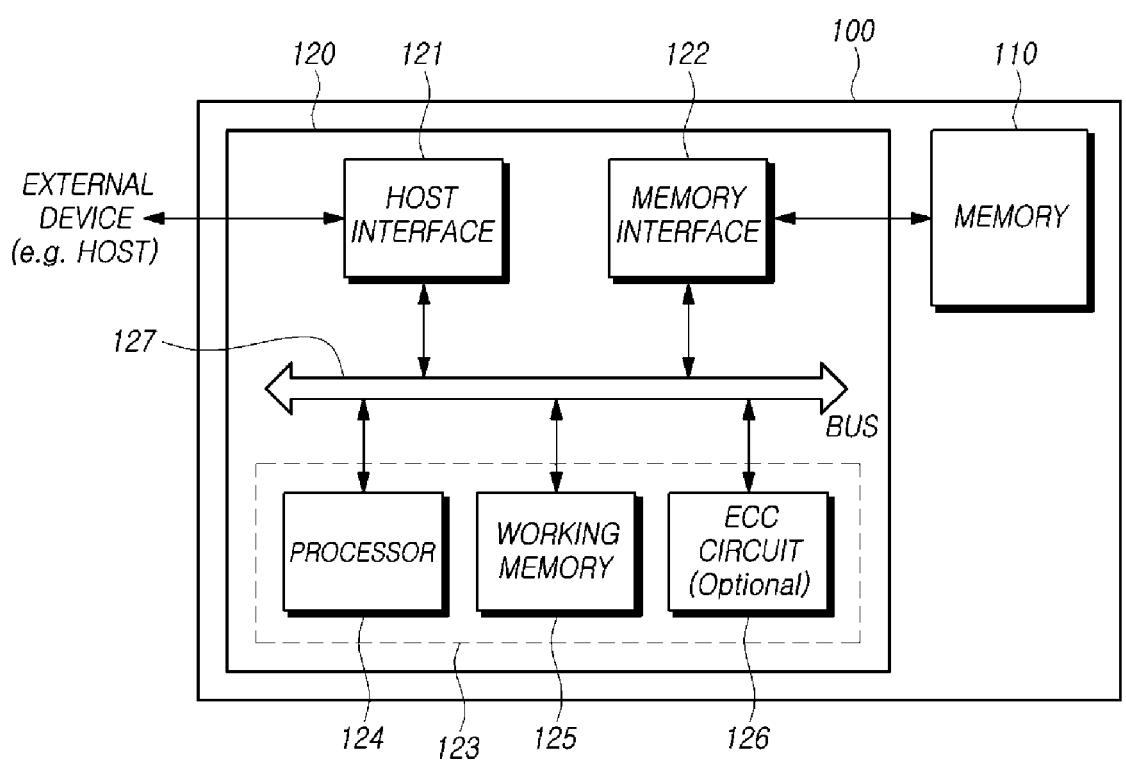
FIG. 1 is a schematic configuration diagram of a storage device according to an embodiment of the disclosure.

Hereinafter, embodiments of the present disclosure are described in detail with reference to the accompanying drawings. Throughout the specification, reference to "an embodiment," "another embodiment" or the like does not necessarily refer to only one embodiment, and different references to any such phrase are not necessarily to the same embodiment(s). The term "embodiments" when used herein does not necessarily refer to all embodiments.

Various embodiments of the present invention are described below in more detail with reference to the accompanying drawings. However, the present invention may be embodied in different forms and variations, and should not be construed as being limited to the embodiments set forth herein. Rather, the described embodiments are provided so that this disclosure will be thorough and complete, and will fully convey the present invention to those skilled in the art to which this invention pertains. Throughout the disclosure, like reference numerals refer to like parts throughout the various figures and embodiments of the present invention.

The methods, processes, and/or operations described herein may be performed by code or instructions to be executed by a computer, processor, controller, or other signal processing device. The computer, processor, controller, or other signal processing device may be those described herein or in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing methods herein.

When implemented at least partially in software, the controllers, processors, devices, modules, units, multiplexers, generators, logic, interfaces, decoders, drivers, generators and other signal generating and signal processing features may include, for example, a memory or other storage device for storing code or instructions to be executed, for example, by a computer, processor, microprocessor, controller, or other signal processing device.

FIG. 1 is a schematic configuration diagram of a storage device 100 according to an embodiment of the disclosure.

Referring to FIG. 1, the storage device 100 may include a memory 110 that stores data and a controller 120 that controls the memory 110.

The memory 110 includes a plurality of memory blocks, and operates in response to the control of the controller 120. Operations of the memory 110 may include, for example, a read operation, a program operation (also referred to as a write operation) and an erase operation.

The memory 110 may include a memory cell array including a plurality of memory cells (also simply referred to as "cells") that store data. Such a memory cell array may exist in a memory block.

For example, the memory 110 may be realized in various types of memory such as a DDR SDRAM (double data rate synchronous dynamic random access memory), an LPDDR4 (low power double data rate 4) SDRAM, a GDDR (graphics double data rate) SDRAM, an LPDDR (low power DDR), an RDRAM (Rambus dynamic random access memory), a NAND flash memory, a 3D NAND flash memory, a NOR flash memory, a resistive random access memory (RRAM), a phase-change memory (PRAM), a magnetoresistive random access memory (MRAM), a ferroelectric random access memory (FRAM) and a spin transfer torque random access memory (SU-RAM).

The memory 110 may be implemented as a three-dimensional array structure. For example, embodiments of the disclosure may be applied to a charge trap flash (CTF) in which a charge storage layer is configured by a dielectric layer and a flash memory in which a charge storage layer is configured by a conductive floating gate.

The memory 110 may receive a command and an address from the controller 120 and may access an area in the memory cell array that is selected by the address. In other words, the memory 110 may perform an operation indicated by the command, on the area selected by the address.

The memory 110 may perform a program operation, a read operation or an erase operation. For example, when performing the program operation, the memory 110 may program data to the area selected by the address. When performing the read operation, the memory 110 may read data from the area selected by the address. In the erase operation, the memory 110 may erase data stored in the area selected by the address.

The controller 120 may control write (program), read, erase and background operations for the memory 110. For example, background operations may include at least one from among a garbage collection (GC) operation, a wear leveling (WL) operation, a read reclaim (RR) operation, a bad block management (BBM) operation, and so forth.

The controller 120 may control the operation of the memory 110 according to a request from a device (e.g., a host) located outside the storage device 100. The controller 120, however, also may control the operation of the memory 110 regardless or in the absence of a request of the host.

The host may be a computer, an ultra mobile PC (UMPC), a workstation, a personal digital assistant (PDA), a tablet, a mobile phone, a smartphone, an e-book, a portable multimedia player (PMP), a portable game player, a navigation device, a black box, a digital camera, a digital multimedia broadcasting (DMB) player, a smart television, a digital audio recorder, a digital audio player, a digital picture recorder, a digital picture player, a digital video recorder, a digital video player, a storage configuring a data center, one of various electronic devices configuring a home network, one of various electronic devices configuring a computer network, one of various electronic devices configuring a telematics network, an RFID (radio frequency identification) device, and a mobility device (e.g., a vehicle, a robot or a drone) capable of driving under human control or autonomous driving, as non-limiting examples.

The host may include at least one operating system (OS). The operating system may generally manage and control the function and operation of the host, and may provide interoperability between the host and the storage device 100. The operating system may be classified into a general operating system and a mobile operating system depending on the mobility of the host.

The controller 120 and the host may be devices that are separated from each other, or the controller 120 and the host may be integrated into one device. Hereunder, for the sake of convenience in explanation, descriptions will describe the controller 120 and the host as devices that are separated from each other.

Referring to FIG. 1, the controller 120 may include a memory interface 122 and a control circuit 123, and may further include a host interface 121.

The host interface 121 provides an interface for communication with the host. For example, the host interface 121 provides an interface that uses at least one from among various interface protocols such as a USB (universal serial bus) protocol, an MMC (multimedia card) protocol, a PCI (peripheral component interconnection) protocol, a PCI-E (PCI-express) protocol, an ATA (advanced technology attachment) protocol, a serial-ATA protocol, a parallel-ATA protocol, an SCSI (small computer system interface) protocol, an ESDI (enhanced small disk interface) protocol, an IDE (integrated drive electronics) protocol and a private protocol.

When receiving a command from the host, the control circuit 123 may receive the command through the host interface 121, and may perform an operation of processing the received command.

The memory interface 122 may be coupled with the memory 110 to provide an interface for communication with the memory 110. That is to say, the memory interface 122 may be configured to provide an interface between the memory 110 and the controller 120 in response to the control of the control circuit 123.

The control circuit 123 performs the general control operations of the controller 120 to control the operation of the memory 110. To this end, for instance, the control circuit 123 may include at least one of a processor 124 and a working memory 125, and may optionally include an error detection and correction circuit (ECC circuit) 126.

The processor 124 may control general operations of the controller 120, and may perform a logic calculation. The processor 124 may communicate with the host through the host interface 121, and may communicate with the memory 110 through the memory interface 122.

The processor 124 may perform the function of a flash translation layer (FTL). The processor 124 may translate a logical block address (LBA), provided by the host, into a physical block address (PBA) through the flash translation layer (FTL). The flash translation layer (FTL) may receive the logical block address (LBA) and translate the logical block address (LBA) into the physical block address (PBA), by using a mapping table.

There are various address mapping methods of the flash translation layer, depending on a mapping unit. Representative address mapping methods include a page mapping method, a block mapping method and a hybrid mapping method.

The processor 124 may randomize data received from the host. For example, the processor 124 may randomize data received from the host by using a set randomizing seed. The randomized data may be provided to the memory 110, and may be programmed to a memory cell array of the memory 110.

In a read operation, the processor 124 may derandomize data received from the memory 110. For example, the processor 124 may derandomize data received from the memory 110 by using a derandomizing seed. The derandomized data may be outputted to the host.

The processor 124 may execute firmware to control the operation of the controller 120. Namely, in order to control the general operation of the controller 120 and perform a logic calculation, the processor 124 may execute (drive) firmware loaded in the working memory 125 upon booting. Hereafter, an operation of the storage device 100 according to embodiments of the disclosure will be described as implementing a processor 124 that executes firmware in which the corresponding operation is defined.

Firmware, as a program to be executed in the storage device 100 to drive the storage device 100, may include various functional layers. For example, the firmware may include binary data in which codes for executing the functional layers, respectively, are defined.

For example, the firmware may include at least one from among a flash translation layer (FTL), which performs a translating function between a logical address requested to the storage device 100 from the host and a physical address of the memory 110; a host interface layer (HIL), which serves to analyze a command requested to the storage device 100 as a storage device from the host and transfer the command to the flash translation layer (FTL); and a flash interface layer (FIL), which transfers a command, instructed from the flash translation layer (FTL), to the memory 110.

Such firmware may be loaded in the working memory 125 from, for example, the memory 110 or a separate nonvolatile memory (e.g., a ROM or a NOR Flash) located outside the memory 110. The processor 124 may first load all or a part of the firmware in the working memory 125 when executing a booting operation after power-on.

The processor 124 may perform a logic calculation, which is defined in the firmware loaded in the working memory 125, to control the general operation of the controller 120. The processor 124 may store a result of performing the logic calculation defined in the firmware, in the working memory 125. The processor 124 may control the controller 120 according to a result of performing the logic calculation defined in the firmware such that the controller 120 generates a command or a signal. When a part of firmware in which a logic calculation to be performed is defined is stored in the memory 110, but not loaded in the working memory 125, the processor 124 may generate an event (e.g., an interrupt) for loading the corresponding part of the firmware into the working memory 125 from the memory 110.

The processor 124 may load metadata necessary for driving firmware from the memory 110. The metadata, as data for managing the memory 110, may include for example management information on user data stored in the memory 110.

Firmware may be updated while the storage device 100 is manufactured or while the storage device 100 is operating. The controller 120 may download new firmware from the outside of the storage device 100 and update existing firmware with the new firmware.

To drive the controller 120, the working memory 125 may store necessary firmware, a program code, a command and data. The working memory 125 may be a volatile memory that includes, for example, at least one from among an SRAM (static RAM), a DRAM (dynamic RAM) and an SDRAM (synchronous DRAM).

The error detection and correction circuit 126 may detect an error bit of target data, and correct the detected error bit by using an error correction code. The target data may be, for example, data stored in the working memory 125 or data read from the memory 110.

The error detection and correction circuit 126 may decode data by using an error correction code. The error detection and correction circuit 126 may be realized by various code decoders. For example, a decoder that performs unsystematic code decoding or a decoder that performs systematic code decoding may be used.

For example, the error detection and correction circuit 126 may detect an error bit by the unit of a set sector in each of read data when each read data is constituted by a plurality of sectors. A sector may mean a data unit that is smaller than a page, which is the read unit of a flash memory. Sectors constituting each read data may be matched with one another using an address.

The error detection and correction circuit 126 may calculate a bit error rate (BER), and may determine whether an error is correctable or not, by sector units. For example, when a bit error rate (BER) is higher than a reference value, the error detection and correction circuit 126 may determine that a corresponding sector is uncorrectable or a fail. On the other hand, when a bit error rate (BER) is lower than the reference value, the error detection and correction circuit 126 may determine that a corresponding sector is correctable or a pass.

The error detection and correction circuit 126 may perform an error detection and correction operation sequentially for all read data. In the case where a sector included in read data is correctable, the error detection and correction circuit 126 may omit an error detection and correction operation for a corresponding sector for next read data. If the error detection and correction operation for all read data is ended in this way, then the error detection and correction circuit 126 may detect a sector which is uncorrectable in read data last. There may be one or more sectors that are determined to be uncorrectable. The error detection and correction circuit 126 may transfer information (e.g., address information) regarding a sector which is determined to be uncorrectable to the processor 124.

A bus 127 may be configured to provide channels among the components 121, 122, 124, 125 and 126 of the controller 120. The bus 127 may include, for example, a control bus for transferring various control signals, commands and the like, a data bus for transferring various data, and so forth.

Some components among the above-described components 121, 122, 124, 125 and 126 of the controller 120 may be omitted, or some components among the above-described components 121, 122, 124, 125 and 126 of the controller 120 may be integrated into one component. In addition to the above-described components 121, 122, 124, 125 and 126 of the controller 120, one or more other components may be added.

Hereinbelow, the memory 110 will be described in further detail with reference to FIG. 2.

Figure 2:
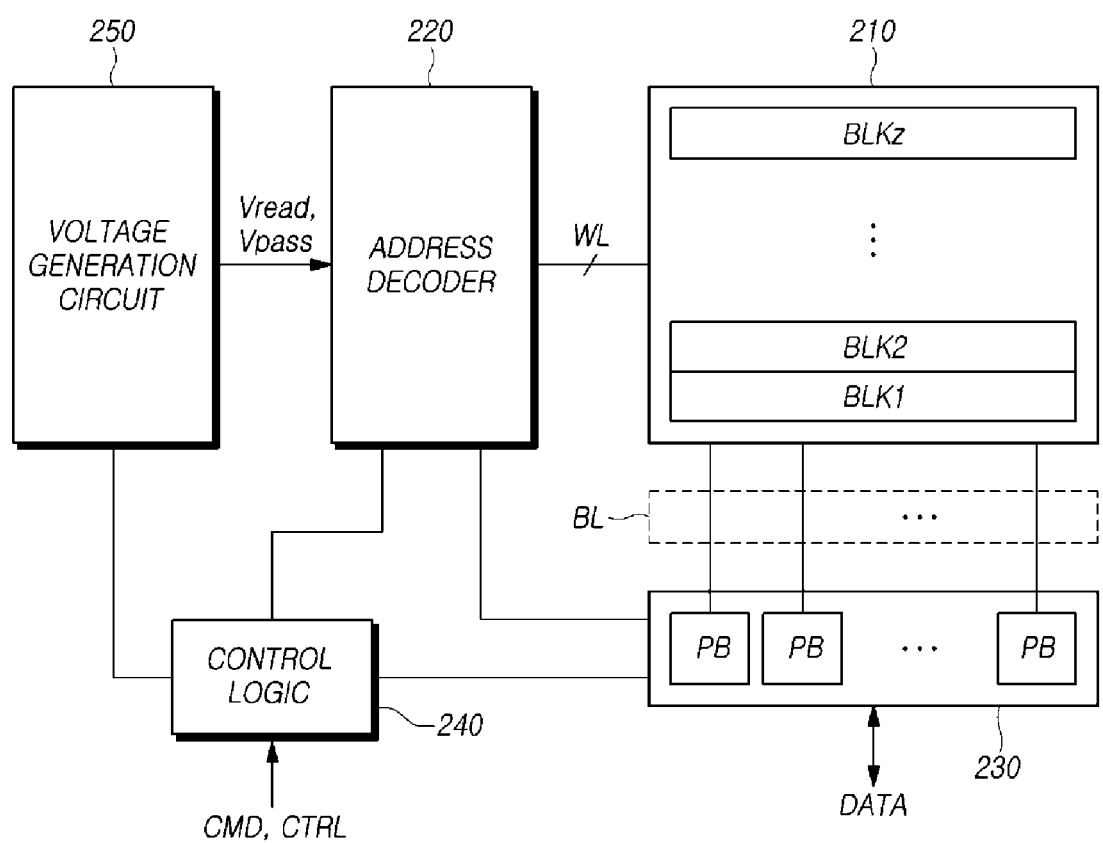
FIG. 2 is a block diagram schematically illustrating a memory of FIG. 1.

FIG. 2 is a block diagram schematically illustrating a memory 110 of FIG. 1.

Referring to FIG. 2, the memory 110 according to an embodiment of the disclosure may include a memory cell array 210, an address decoder 220, a read and write circuit 230, a control logic 240, and a voltage generation circuit 250.

The memory cell array 210 may include a plurality of memory blocks BLK1 to BLKz (where z is a natural number of 2 or greater).

In the plurality of memory blocks BLK1 to BLKz, a plurality of word lines WL and a plurality of bit lines BL may be disposed, and a plurality of memory cells (MC) may be arranged.

The plurality of memory blocks BLK1 to BLKz may be coupled with the address decoder 220 through the plurality of word lines WL. The plurality of memory blocks BLK1 to BLKz may be coupled with the read and write circuit 230 through the plurality of bit lines BL.

Each of the plurality of memory blocks BLK1 to BLKz may include a plurality of memory cells. For example, the plurality of memory cells may be nonvolatile memory cells, and may be configured by nonvolatile memory cells that have vertical channel structures.

The memory cell array 210 may be configured by a memory cell array of a two-dimensional structure or may be configured by a memory cell array of a three-dimensional structure.

Each of the plurality of memory cells included in the memory cell array 210 may store at least 1-bit data. For instance, each of the plurality of memory cells included in the memory cell array 210 may be a signal level cell (SLC) that stores 1-bit data. In another instance, each of the plurality of memory cells included in the memory cell array 210 may be a multi-level cell (MLC) that stores 2-bit data.

In still another instance, each of the plurality of memory cells included in the memory cell array 210 may be a triple level cell (TLC) that stores 3-bit data. In yet another instance, each of the plurality of memory cells included in the memory cell array 210 may be a quad level cell (QLC) that stores 4-bit data. In a further instance, the memory cell array 210 may include a plurality of memory cells, each of which stores 5 or more-bit data.

The number of bits of data stored in each of the plurality of memory cells may be dynamically determined. For example, a single-level cell that stores 1-bit data may be changed to a triple-level cell that stores 3-bit data.

Referring to FIG. 2, the address decoder 220, the read and writhe circuit 230, the control logic 240 and the voltage generation circuit 250 may operate as a peripheral circuit that drives the memory cell array 210.

The address decoder 220 may be coupled to the memory cell array 210 through the plurality of word lines WL.

The address decoder 220 may be configured to operate in response to the control of the control logic 240.

The address decoder 220 may receive an address through an input/output buffer in the memory 110. The address decoder 220 may be configured to decode a block address in the received address. The address decoder 220 may select at least one memory block depending on the decoded block address.

The address decoder 220 may receive a read voltage Vread and a pass voltage Vpass from the voltage generation circuit 250.

The address decoder 220 may apply the read voltage Vread to a selected word line WL in a selected memory block during a read operation, and may apply the pass voltage Vpass to the remaining unselected word lines WL.

The address decoder 220 may apply a verify voltage generated in the voltage generation circuit 250 to a selected word line WL in a selected memory block in a program verify operation, and may apply the pass voltage Vpass to the remaining unselected word lines WL.

The address decoder 220 may be configured to decode a column address in the received address. The address decoder 220 may transmit the decoded column address to the read and write circuit 230.

A read operation and a program operation of the memory 110 may be performed by the unit of a page. An address received when a read operation or a program operation is requested may include at least one from among a block address, a row address and a column address.

The address decoder 220 may select one memory block and one word line depending on a block address and a row address. A column address may be decoded by the address decoder 220 and be provided to the read and write circuit 230.

The address decoder 220 may include at least one from among a block decoder, a row decoder, a column decoder and an address buffer.

The read and write circuit 230 may include a plurality of page buffers PB. The read and write circuit 230 may operate as a read circuit in a read operation of the memory cell array 210, and may operate as a write circuit in a write operation of the memory cell array 210.

The read and write circuit 230 described above may also be referred to as a page buffer circuit or a data register circuit that includes a plurality of page buffers PB. The read and write circuit 230 may include data buffers that take charge of a data processing function, and may further include cache buffers that take charge of a caching function.

The plurality of page buffers PB may be coupled to the memory cell array 210 through the plurality of bit lines BL. The plurality of page buffers PB may continuously supply sensing current to bit lines BL coupled with memory cells to sense threshold voltages (Vth) of the memory cells in a read operation and a program verify operation, and may latch sensing data by sensing, through sensing nodes, changes in the amounts of current flowing, depending on the programmed states of the corresponding memory cells.

The read and write circuit 230 may operate in response to page buffer control signals outputted from the control logic 240.

In a read operation, the read and write circuit 230 temporarily stores read data by sensing data of memory cells, and then, outputs data DATA to the input/output buffer of the memory 110. As an exemplary embodiment, the read and write circuit 230 may include a column select circuit in addition to the page buffers PB or the page registers.

The control logic 240 may be coupled with the address decoder 220, the read and write circuit 230 and the voltage generation circuit 250. The control logic 240 may receive a command CMD and a control signal CTRL through the input/output buffer of the memory 110.

The control logic 240 may be configured to control general operations of the memory 110 in response to the control signal CTRL. The control logic 240 may output control signals for adjusting the precharge potential levels of the sensing nodes of the plurality of page buffers PB.

The control logic 240 may control the read and write circuit 230 to perform a read operation of the memory cell array 210. The voltage generation circuit 250 may generate the read voltage Vread and the pass voltage Vpass used in a read operation, in response to a voltage generation circuit control signal outputted from the control logic 240.

Each memory block of the memory 110 described above may be configured by a plurality of pages corresponding to a plurality of word lines WL and a plurality of strings corresponding to a plurality of bit lines BL.

In a memory block BLK, a plurality of word lines WL and a plurality of bit lines BL may be disposed to intersect with each other. For example, each of the plurality of word lines WL may be disposed in a row direction, and each of the plurality of bit lines BL may be disposed in a column direction. For another example, each of the plurality of word lines WL may be disposed in a column direction, and each of the plurality of bit lines BL may be disposed in a row direction.

A memory cell may be coupled to one of the plurality of word lines WL and one of the plurality of bit lines BL. A transistor may be disposed in each memory cell.

For example, a transistor disposed in each memory cell (MC) may include a drain, a source and a gate. The drain (or source) of the transistor may be coupled with a corresponding bit line BL directly or via another transistor. The source (or drain) of the transistor may be coupled with a source line (which may be the ground) directly or via another transistor. The gate of the transistor may include a floating gate, which is surrounded by a dielectric, and a control gate to which a gate voltage is applied from a word line WL.

In each memory block, a first select line (also referred to as a source select line or a drain select line) may be additionally disposed outside a first outermost word line more adjacent to the read and write circuit 230 between two outermost word lines, and a second select line (also referred to as a drain select line or a source select line) may be additionally disposed outside a second outermost word line between the two outermost word lines.

At least one dummy word line may be additionally disposed between the first outermost word line and the first select line. At least one dummy word line may also be additionally disposed between the second outermost word line and the second select line.

A read operation and a program operation (write operation) of the memory block described above may be performed by the unit of a page, and an erase operation may be performed by the unit of a memory block.

Figure 3:
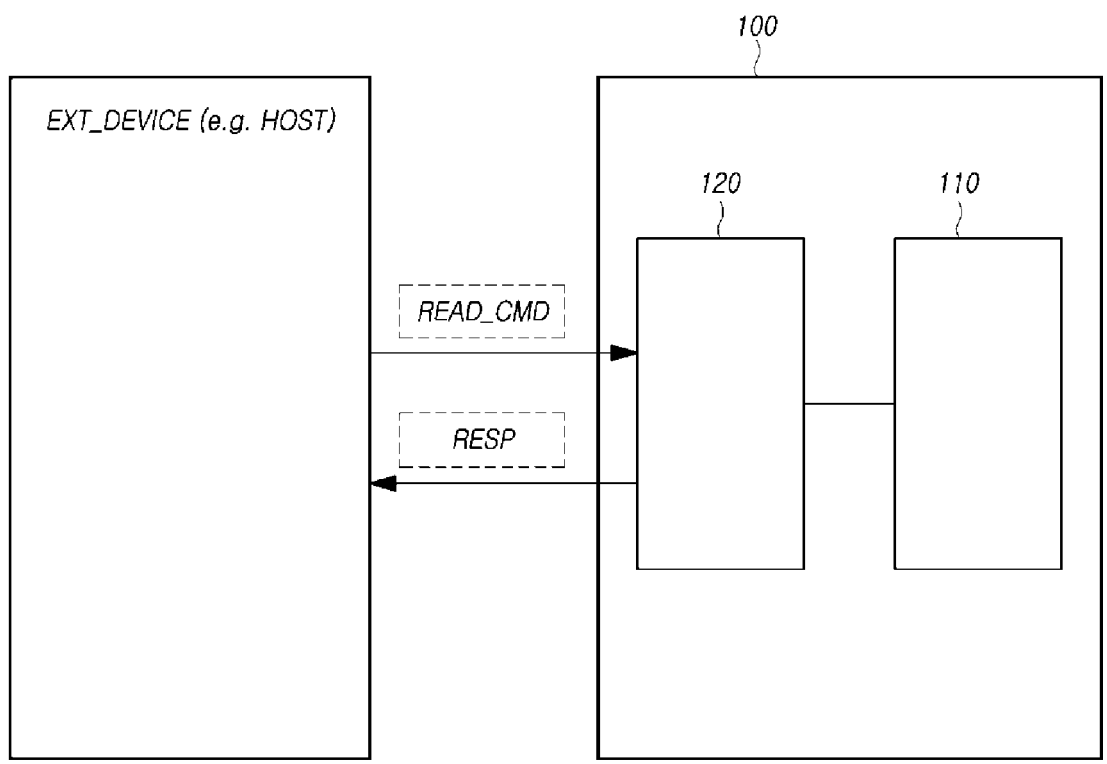
FIG. 3 is a diagram illustrating a schematic structure of a system according to an embodiment of the disclosure.

FIG. 3 is a diagram illustrating a schematic structure of a system 10 according to an embodiment of the disclosure.

Referring to FIG. 3, the system 10 may include a storage device 100 and an external device EXT_DEVICE. The external device EXT_DEVICE, as a device which is located outside the storage device 100, may be for example, the host described above with reference to FIG. 1.

The storage device 100 may include a memory 110 and a controller 120.

The memory 110 may store data. For example, the memory 110 may store data in the memory block described above with reference to FIG. 1.

The controller 120 may receive a read command READ_CMD transmitted by the external device EXT_DEVICE. The controller 120 may read data requested by the read command READ_CMD, from the memory 110.

The controller 120 may transmit a response RESP regarding a result of executing the read command READ_CMD to the external device EXT_DEVICE. For example, the response RESP regarding a result of executing the read command READ_CMD may indicate whether reading of data, requested by the read command READ_CMD, from the memory 110 has succeeded or failed. For example, the response RESP may include data read from the memory 110.

The controller 120 may communicate with the external device EXT_DEVICE through a preset interface (e.g., NVMe).

Hereinafter, schematic operations of the above-described external device EXT_DEVICE and storage device 100 will be described with reference to FIG. 4.

Figure 4:
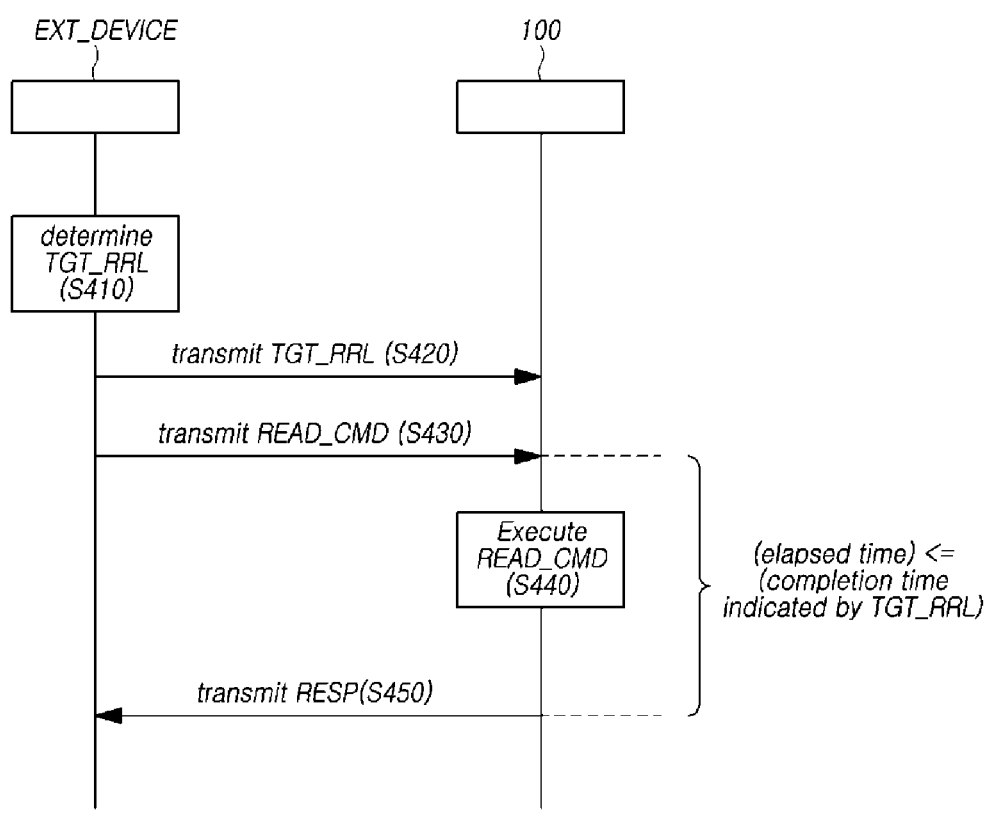
FIG. 4 is a sequence diagram illustrating schematic operations of an external device and a storage device according to an embodiment of the disclosure.

FIG. 4 is a sequence diagram illustrating schematic operations of an external device EXT_DEVICE and a storage device 100 according to an embodiment of the disclosure.

Referring to FIG. 4, the external device EXT_DEVICE may determine a target read recovery level TGT_RRL (S410).

The target read recovery level TGT_RRL may indicate information on a read command execution completion time and an error recovery amount requested by the external device EXT_DEVICE.

The read command execution completion time means a limit time during which a read command transmitted by the external device EXT_DEVICE should be executed. That is to say, the storage device 100 should execute the read command transmitted by the external device EXT_DEVICE within the read command execution completion time indicated by the target read recovery level TGT_RRL, and transmit an execution result to the external device EXT_DEVICE as a response.

The error recovery amount means the amount of errors, which occurred in the process of executing the read command transmitted by the external device EXT_DEVICE, may be recovered. Recovering an error means correcting the error.

In embodiments of the disclosed technology, the read command execution completion time and the error recovery amount may be correlated with each other.

For example, as the read command execution completion time increases, the storage device 100 may use more time to recover all of the errors that occurred in data requested by the read command. An increase in the amount of time required to correct errors may be associated with an increase in the amount of errors that require recovery.

On the other hand, as the read command execution completion time decreases, the storage device 100 may use a shorter amount of time to recover errors occurring in data requested by the read command. Accordingly, the error recovery amount may decrease.

The external device EXT_DEVICE may transmit the above-described target read recovery level TGT_RRL to the storage device 100 (S420). The target read recovery level TGT_RRL may be transmitted to the storage device 100 through an interface (e.g., NVMe) set between the controller 120 of the storage device 100 and the external device EXT_DEVICE.

For example, the external device EXT_DEVICE may transmit the target read recovery level TGT_RRL to the storage device 100 through a part of a reserved field of an identify controller data structure (CNS 01h) defined in the NVMe interface.

Thereafter, the external device EXT_DEVICE may transmit a read command READ_CMD to the storage device 100 (S430).

The controller 120 of the storage device 100 may execute the read command READ_CMD S440.

The controller 120 of the storage device 100 may transmit a response RESP regarding a result of executing the read command READ_CMD to the external device EXT_DEVICE (S450). The controller 120 transmits the response RESP regarding a result of executing the read command READ_CMD within the read command execution completion time indicated by the target read recovery level TGT_RRL.

In other words, the controller 120 unconditionally transmits a result of executing the read command READ_CMD to the external device EXT_DEVICE within the read command execution completion time indicated by the target read recovery level TGT_RRL, regardless of the result of executing the read command READ_CMD.

As a result, the controller 120 may ensure that the read command READ_CMD is necessarily executed within a time requested by the external device EXT_DEVICE, thereby reducing a time required to execute the read command READ_CMD.

The external device EXT_DEVICE may determine the target read recovery level TGT_RRL on the basis of a plurality of candidate read recovery levels which may be supported by the storage device 100. Hereinafter, this will be described in detail with reference to FIG. 5.

Figure 5:
FIG. 5 is a diagram illustrating an example of candidate read recovery levels according to an embodiment of the disclosure.

FIG. 5 is a diagram illustrating an example of candidate read recovery levels according to an embodiment of the disclosure.

Referring to FIG. 5, a storage device 100 may support a total of 16 candidate read recovery levels RRL_CAND from a level 0 to a level 15. However, the number of candidate read recovery levels RRL_CAND that may be supported by the storage device 100 is not limited to the number in embodiments illustrated by FIG. 5. For example, the storage device 100 may support only some of the above-described 16 candidate read recovery levels RRL_CAND.

The storage device 100 must support a specific candidate read recovery level among the candidate read recovery levels RRL_CAND. For example, in FIG. 5, it is mandatory for the storage device 100 to support candidate read recovery level 4 and level 15.

In FIG. 5, the smaller the index value of a candidate read recovery is, the larger a read command execution completion time. Thus, the candidate read recovery level 0 indicates a maximum read command execution completion time, and the candidate read recovery level 15 indicates a minimum read command execution completion time.

The magnitude of a read command execution completion time according to a candidate read recovery level may be changed according to the characteristics of the storage device 100.

In embodiments of the disclosure, the storage device 100 may transmit the candidate read recovery levels RRL_CAND to the external device EXT_DEVICE.

The external device EXT_DEVICE may determine the above-described target read recovery level TGT_RRL in consideration of the candidate read recovery levels RRL_CAND received from the storage device 100. Hereinafter, this will be described in detail with reference to FIG. 6.

Figure 6:
FIG. 6 is a diagram illustrating an example of candidate read recovery levels and candidate target read recovery levels according to an embodiment of the disclosure.

FIG. 6 is a diagram illustrating an example of candidate read recovery levels and candidate target read recovery levels according to an embodiment of the disclosed technology.

The external device EXT_DEVICE may determine one of a plurality of candidate target read recovery levels as a target read recovery level. In FIG. 6, the external device EXT_DEVICE may select one of a total of 32 candidate target read recovery levels TGT_RRL_CAND from a level 0 to a level 31 as the target read recovery level TGT_RRL.

The number of candidate target read recovery levels TGT_RRL_CAND may be a multiple of the number of candidate read recovery levels RRL_CAND that can be supported by the storage device 100. In FIG. 6, the number of candidate target read recovery levels TGT_RRL_CAND is 32, which is a multiple of the number of candidate read recovery levels RRL_CAND (16) that may be supported by the storage device 100.

Some of the candidate target read recovery levels TGT_RRL_CAND may correspond to one of the candidate read recovery levels RRL_CAND supported by the storage device 100.

For example, in FIG. 6, the level 0 among the candidate target read recovery levels TGT_RRL_CAND may correspond to the level 0 of the candidate read recovery levels RRL_CAND, and the level 2 of the candidate target read recovery levels TGT_RRL_CAND may correspond to the level 1 of the candidate read recovery levels RRL_CAND. In the same manner, a level 2K (where K is an integer) from among the candidate target read recovery levels TGT_RRL_CAND may correspond to a level K of the candidate read recovery levels RRL_CAND.

In embodiments of the disclosed technology, however, the number of candidate target read recovery levels TGT_RRL_CAND is not necessarily limited to a multiple of the number of candidate read recovery levels RRL_CAND that are supported by the storage device 100.

In addition, mapping of some of the candidate target read recovery levels TGT_RRL_CAND to any one of the candidate read recovery levels RRL_CAND is not required.

Figure 7:
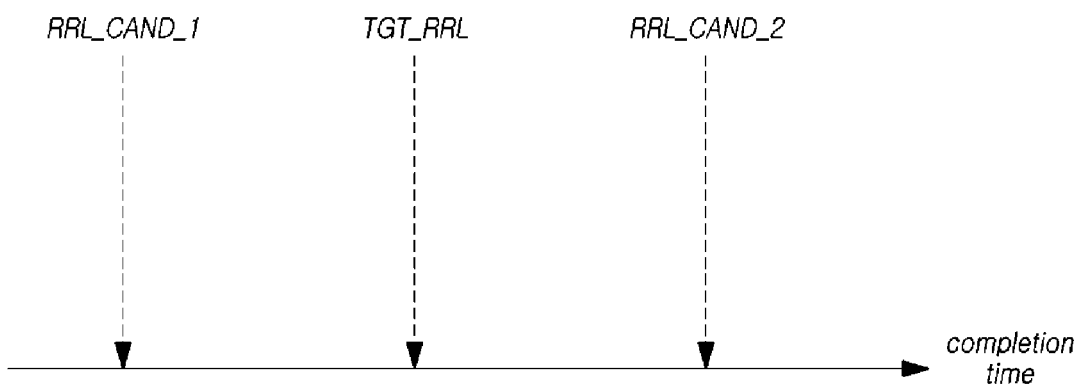
FIG. 7 is a diagram illustrating an example of a read command execution completion time of a target read recovery level according to an embodiment of the disclosure.

FIG. 7 is a diagram illustrating an example of a read command execution completion time of the target read recovery level TGT_RRL according to an embodiment of the disclosure.

In FIG. 7, the read command execution completion time of the target read recovery level TGT_RRL is larger than the read command execution completion time of a first candidate read recovery level RRL_CAND_1 and is smaller than the read command execution completion time of a second candidate read recovery level RRL_CAND_2.

When the storage device 100 operates according to the first candidate read recovery level RRL_CAND_1, the storage device 100 may transmit a response regarding a result of executing a read command earlier than a level desired by the external device EXT_DEVICE.

On the other hand, when the storage device 100 operates according to the second candidate read recovery level RRL_CAND_2, the storage device 100 may transmit a response regarding a result of executing a read command later than a level desired by the external device EXT_DEVICE.

That is to say, both the first candidate read recovery level RRL_CAND_1 and the second candidate read recovery level RRL_CAND_2 are different from an optimal read recovery level desired by the external device EXT_DEVICE.

In this case, by transmitting the target read recovery level TGT_RRL to the storage device 100, the external device EXT_DEVICE may control the storage device 100 such that the storage device 100 executes a read command according to a level desired by the external device EXT_DEVICE.

Figure 8:
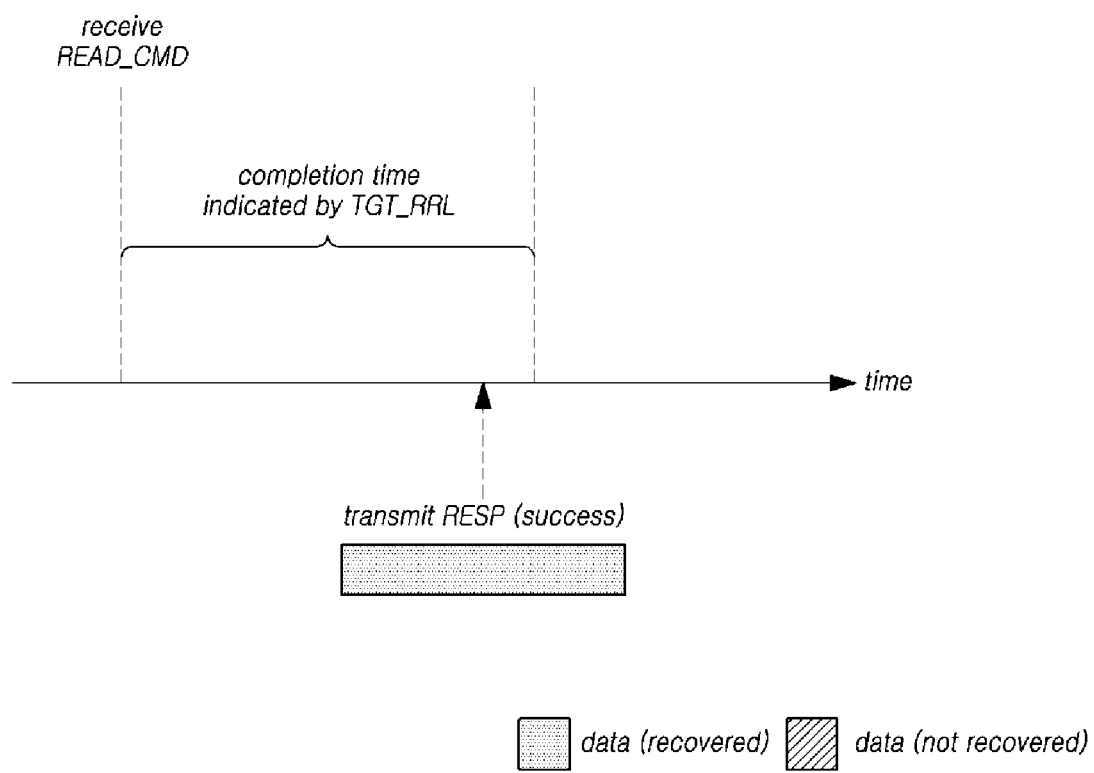
FIG. 8 is a diagram illustrating an example in which a storage device responds to a read command received from an external device according to an embodiment of the disclosure.

FIG. 8 is a diagram illustrating an example in which a storage device 100 responds to a read command READ_CMD received from an external device EXT_DEVICE according to an embodiment of the disclosure.

Referring to FIG. 8, after receiving the read command READ_CMD from the external device EXT_DEVICE, the storage device 100 may read data requested by the read command READ_CMD and complete an error recovery operation for the data requested by the read command READ_CMD, before the read command execution completion time of the target read recovery level TGT_RRL elapses.

The storage device 100 may transmit a response RESP regarding a result of executing the read command READ_CMD to the external device EXT_DEVICE before the read command execution completion time of the target read recovery level TGT_RRL elapses.

The response RESP may indicate that the read command READ_CMD has been successfully executed. The response RESP may include the data requested by the read command READ_CMD.

Figure 9:
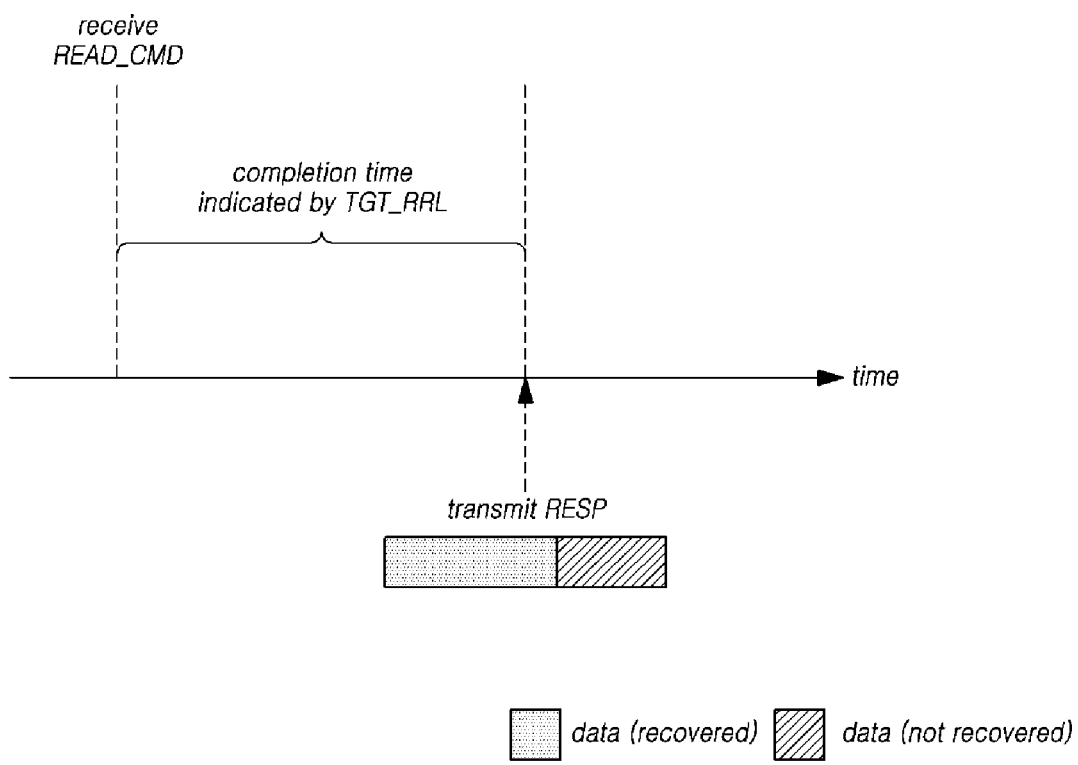
FIG. 9 is a diagram illustrating another example in which a storage device responds to a read command received from an external device according to an embodiment of the disclosure.

FIG. 9 is a diagram illustrating another example in which the storage device 100 responds to a read command READ_CMD received from the external device EXT_DEVICE according to an embodiment of the disclosure.

Referring to FIG. 9, after the storage device 100 receives the read command READ_CMD from the external device EXT_DEVICE, the read command execution completion time of the target read recovery level TGT_RRL may elapse before an error recovery operation for data requested by the read command READ_CMD is completed.

When the read command execution completion time of the target read recovery level TGT_RRL elapses, the storage device 100 transmits a response RESP regarding a result of executing the read command READ_CMD to the external device EXT_DEVICE, regardless of whether the error recovery operation is completed.

A part of the data requested by the read command READ_CMD may be in a state in which error recovery is not performed.

Hereinafter, detailed embodiments, in which the storage device 100 unconditionally transmits the response RESP regarding a result of executing the read command READ_CMD to the external device EXT_DEVICE when the read command execution completion time of the target read recovery level TGT_RRL elapses, will be described with reference to FIGS. 10 and 11.

Figure 10:
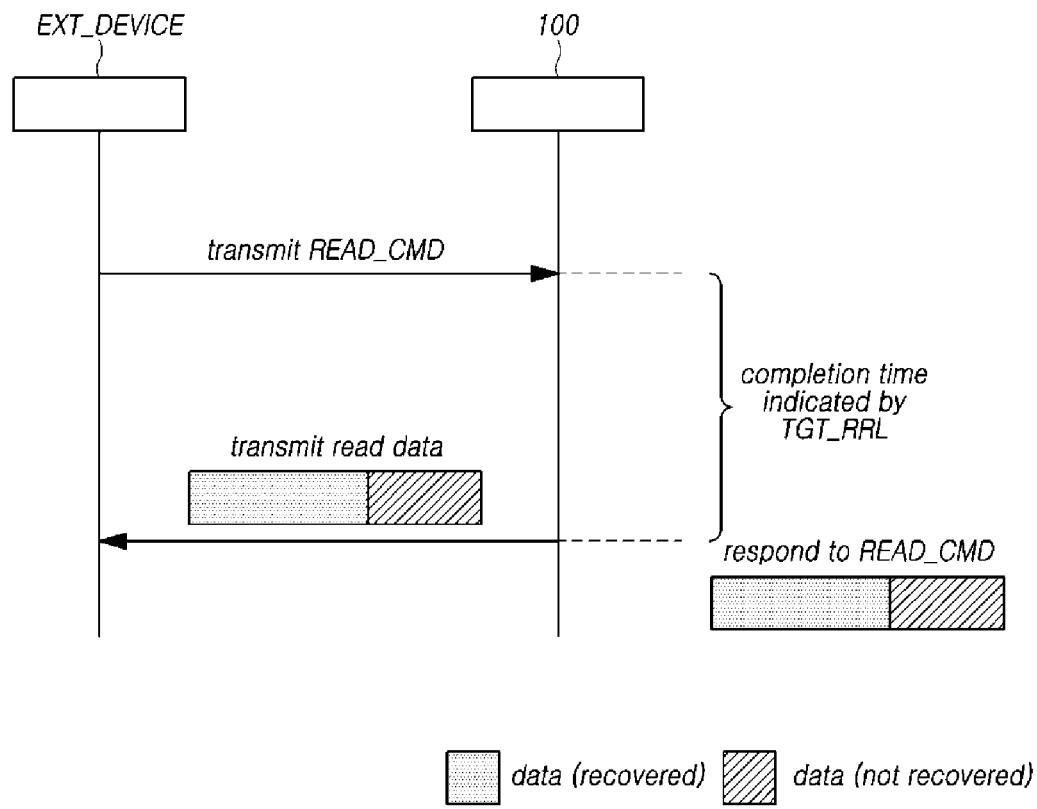
FIG. 10 is a sequence diagram illustrating an example of an operation in which a storage device executes a read command according to an embodiment of the disclosure.

FIG. 10 is a sequence diagram illustrating an example of an operation in which a storage device 100 executes a read command READ_CMD according to an embodiment of the disclosure.

Referring to FIG. 10, after receiving the read command READ_CMD from the external device EXT_DEVICE, the storage device 100 may transmit a result of performing error recovery for data requested by the read command READ_CMD to the external device EXT_DEVICE when the read command execution completion time of the target read recovery level TGT_RRL elapses.

At this time, even though error recovery for the data requested by the read command READ_CMD is not completed, the storage device 100 may transmit the data requested by the read command READ_CMD to the external device EXT_DEVICE as is. The external device EXT_DEVICE may or may not perform error handling or correction on the received data.

For example, when an error in data read from the storage device 100 does not affect an operation of the external device EXT_DEVICE, such as machine learning or deep learning operations, there is no effect on external device EXT_DEVICE and the storage device 100 may not need to perform additional error correction in the data. In addition, because the storage device 100 does not recover all of the data, the storage device 100 may operate more efficiently.

In another example, if the external device EXT_DEVICE allows an error rate below a predetermined level, then it is possible that operations are not affected even when some of the data read from the storage device 100 is not used. In this case, the external device EXT_DEVICE may not need to read data which may not be used by the external device EXT_DEVICE. In these examples, the external device EXT_DEVICE and/or the storage device 100 may operate more efficiently.

The storage device 100 may additionally transmit, to the external device EXT_DEVICE, error recovery level information indicating a degree to which error recovery is performed for data requested by the read command READ_CMD.

When the size of data requested by the read command READ_CMD is equal to or larger than a threshold data size, the storage device 100 may additionally transmit error recovery level information to the external device EXT_DEVICE.

The error recovery level information may indicate a location and a size of a portion of data requested by the read command READ_CMD, for which error recovery is performed.

On the basis of the error recovery level information received from the storage device 100, the external device EXT_DEVICE may determine a portion of the data requested by the read command READ_CMD, for which error recovery is performed, and a portion for which error recovery is not performed.

Figure 11:
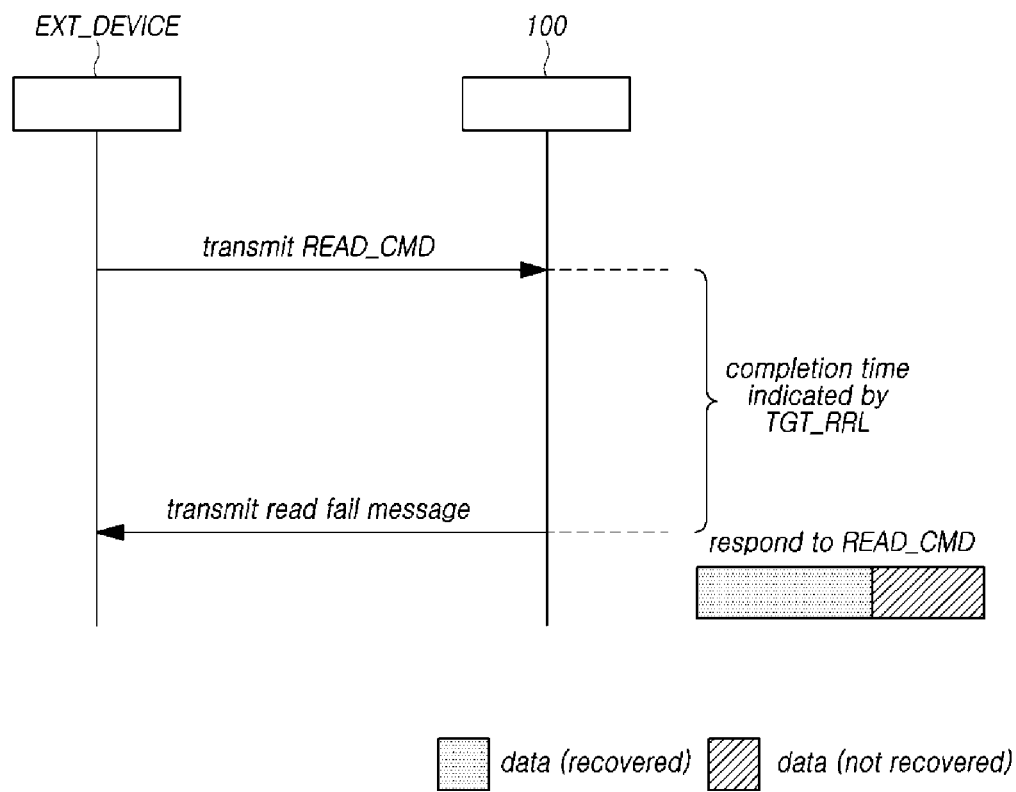
FIG. 11 is a sequence diagram illustrating another example of an operation in which a storage device executes a read command according to an embodiment of the disclosure.

FIG. 11 is a sequence diagram illustrating another example of an operation in which a storage device 100 executes a read command READ_CMD according to an embodiment of the disclosure.

Referring to FIG. 11, after receiving the read command READ_CMD from the external device EXT_DEVICE, the storage device 100 may transmit whether an error of data requested by the read command READ_CMD has been recovered, to the external device EXT_DEVICE when the read command execution completion time of the target read recovery level TGT_RRL elapses. In other words, the storage device 100 may transmit whether error recovery for the data requested by the read command READ_CMD has succeeded or failed, to the external device EXT_DEVICE.

When the size of data requested by the read command READ_CMD is smaller than a threshold data size, the storage device 100 may additionally transmit error recovery level information to the external device EXT_DEVICE.

For example, the storage device 100 may transmit information indicating that error recovery for the data requested by the read command READ_CMD has failed, to the external device EXT_DEVICE.

In this case, the external device EXT_DEVICE may perform an error handling operation on the basis of whether error recovery for the data requested by the read command READ_CMD is possible.

Figure 12:
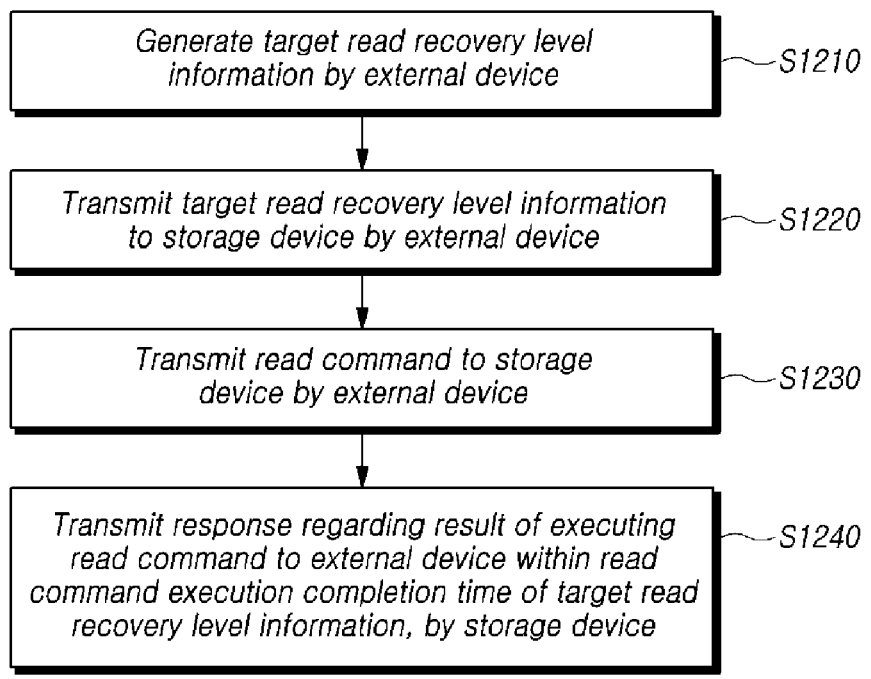
FIG. 12 is a diagram illustrating a method for operating a system according to an embodiment of the disclosure.

FIG. 12 is a diagram illustrating a method for operating a system 10 according to an embodiment of the disclosure.

Referring to FIG. 12, the method for operating the system 10 may include generating the target read recovery level TGT_RRL by the external device EXT_DEVICE (S1210). The target read recovery level TGT_RRL may include information on a read command execution completion time and an error recovery amount requested by the external device EXT_DEVICE.

For example, the target read recovery level TGT_RRL may be determined on the basis of the plurality of candidate read recovery levels RRL_CAND that can be supported by the storage device 100. Each of the candidate read recovery levels RRL_CAND may indicate information on a read command execution completion time and an error recovery amount that may be supported by the storage device 100.

The method for operating the system 10 may include transmitting the target read recovery level TGT_RRL to the storage device 100 by the external device EXT_DEVICE (S1220).

The method for operating the system 10 may include transmitting the read command READ_CMD to the storage device 100 by the external device EXT_DEVICE (S1230).

The method for operating the system 10 may include transmitting the response RESP regarding a result of executing the read command READ_CMD to the external device EXT_DEVICE by the storage device 100 within the read command execution completion time of the target read recovery level TGT_RRL (S1240).

For example, at the step S1240, a result of performing error recovery for data requested by the read command READ_CMD may be transmitted to the external device EXT_DEVICE.

For another example, at the step S1240, whether an error of the data requested by the read command READ_CMD has been recovered may be transmitted to the external device EXT_DEVICE.

Although exemplary embodiments of the disclosure have been described for illustrative purposes, those skilled in the art will appreciate that various modifications, additions and substitutions are possible, without departing from the scope and spirit of the disclosure. Therefore, the embodiments disclosed above and in the accompanying drawings should be considered in a descriptive sense only and not for limiting the technological scope. The technological scope of the disclosure is not limited by the embodiments and the accompanying drawings. The spirit and scope of the disclosure should be interpreted in connection with the appended claims and encompass all equivalents falling within the scope of the appended claims.

What is claimed is:

1. A storage device comprising:
   a memory configured to store data; and
   a controller configured to transmit a plurality of candidate read recovery levels to an external device, and receive, from the external device, a target read recovery level indicating a read command execution completion time and an error recovery amount requested by the external device; configured to read, from the memory, data requested by a read command transmitted by the external device; configured to perform error recovery on data requested by the read command; and configured to transmit, to the external device, a result of executing the read command within the read command execution completion time indicated by the target read recovery level,
   wherein the target read recovery level is determined on the basis of the plurality of candidate read recovery levels, and
   each of the plurality of candidate read recovery levels indicates information on a read command execution completion time and an error recovery amount and the plurality of candidate read recovery levels includes a maximum read command execution completion time and a minimum read command execution completion time for the storage device.

2. The storage device according to claim 1, wherein the read command execution completion time of the target read recovery level is larger than a read command execution completion time of a first candidate read recovery level, from among the candidate read recovery levels, and is smaller than a read command execution completion time of a second candidate read recovery level, from among the candidate read recovery levels.

3. The storage device according to claim 1, wherein
   the target read recovery level is one of a plurality of candidate target read recovery levels, and
   the number of the candidate target read recovery levels is a multiple of the number of the candidate read recovery levels.

4. The storage device according to claim 1, wherein the controller transmits, to the external device, a result of executing error recovery for data requested by the read command.

5. The storage device according to claim 1, wherein the controller transmits, to the external device, whether an error of data requested by the read command has been recovered.

6. A system comprising:
   a storage device configured to execute a read command; and
   an external device configured to receive a plurality of candidate read recovery levels from the storage device, and transmit, to the storage device, a target read recovery level indicating information on a read command execution completion time and an error recovery amount, and to transmit a read command to the storage device,
   wherein the external device determines the target read recovery level on the basis of the plurality of candidate read recovery levels, and
   each of the plurality of candidate read recovery levels indicates information on a read command execution completion time and an error recovery amount and the plurality of candidate read recovery levels includes a maximum read command execution completion time and a minimum read command execution completion time for the storage device.

7. The system according to claim 6, wherein the read command execution completion time of the target read recovery level is larger than a read command execution completion time of a first candidate read recovery level, from among the candidate read recovery levels, and is smaller than a read command execution completion time of a second candidate read recovery level, from among the candidate read recovery levels.

8. The system according to claim 6, wherein
the target read recovery level is one of a plurality of candidate target read recovery levels, and
the number of the candidate target read recovery levels is a multiple of the number of the candidate read recovery levels.

9. The system according to claim 6, wherein the storage device transmits, to the external device, a result of executing error recovery for data requested by the read command.

10. The system according to claim 6, wherein the storage device transmits, to the external device, whether an error of data requested by the read command has been recovered.

11. A method for operating a system, comprising:
generating, by an external device, a target read recovery level indicating information on a read command execution completion time and an error recovery amount requested by the external device, the target read recovery level determined on the basis of a plurality of candidate read recovery levels received from a storage device;
transmitting, by the external device, the target read recovery level to a storage device;
transmitting, by the external device, a read command to the storage device; and
transmitting, by the storage device, a response regarding a result of executing the read command to the external device, within the read command execution completion time indicated by the target read recovery level,
wherein each of the plurality of candidate read recovery levels indicates information on a read command execution completion time and an error recovery amount and the plurality of candidate read recovery levels includes a maximum read command execution completion time and a minimum read command execution completion time for the storage device.

12. The method according to claim 11, wherein the read command execution completion time of the target read recovery level is larger than a read command execution completion time of a first candidate read recovery level, from among the candidate read recovery levels, and is smaller than a read command execution completion time of a second candidate read recovery level, from among the candidate read recovery levels.

13. The method according to claim 11, wherein
the target read recovery level is one of a plurality of candidate target read recovery levels, and
the number of the candidate target read recovery levels is a multiple of the number of the candidate read recovery levels.

14. The method according to claim 11, wherein the transmitting, by the storage device, the response regarding the result of executing the read command, to the external device, comprises:
transmitting, to the external device, a result of executing error recovery for data requested by the read command.

15. The method according to claim 11, wherein the transmitting, by the storage device, the response regarding the result of executing the read command, to the external device, comprises:
transmitting, to the external device, whether an error of data requested by the read command has been recovered.

* * * * *